J. E. WOOTTEN.

Rivets.

No. 5,567.

Reissued September 9, 1873.

Witnesses { Wm. A. Steel
John K. Luperline

J. E. Wootten
by his attys.
Howson and Son

UNITED STATES PATENT OFFICE.

JOHN E. WOOTTEN, OF READING, PENNSYLVANIA.

IMPROVEMENT IN RIVETS.

Specification forming part of Letters Patent No. 67,624, dated August 6, 1867; reissue No. 5,567, dated September 9, 1873; application filed July 30, 1872.

DIVISION A.

*To all whom it may concern:*

Be it known that I, JOHN E. WOOTTEN, formerly of Cressona, Schuylkill county, but now of Reading, county of Berks, in the State of Pennsylvania, have invented an Improvement in Rivets, of which the following is a specification:

My invention consists of a tubular rivet made by coiling a strip of flat bar or plate iron, as described hereafter, a rivet thus made being especially applicable to the fastening of rail-splices, inasmuch as it can be secured without any preliminary heating. My invention further consists in so making the rivet that the grain of the iron shall take a transverse course at right angles, or thereabout, to the axis of the rivets.

Figure 1:
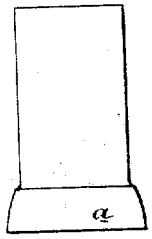
Figure 2:
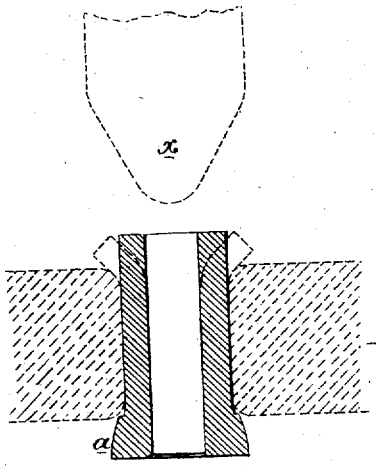

In the accompanying drawing, Figure 1 is an exterior view of my improved rivet; Fig. 2, a sectional view; and Figs. 3 and 4, diagrams illustrating the mode of manufacturing the rivets.

Figure 3:
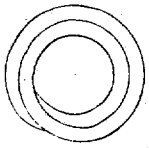
Figure 4:
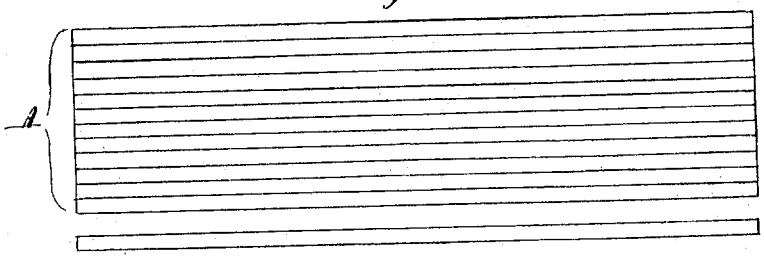

The improved rivet is made of ordinary flat bar or plate iron, a strip, A, Fig. 4, of which is cut to the desired length, beveled at the ends, and then bent into a coil, Fig. 3; and this coil may be welded and a head, *a*, formed at one end, as seen in Figs. 1 and 2.

In using the tubular rivet, all that is necessary is to introduce it while cold into its place, (see Fig. 2,) and for one workman to hold a suitable bar against the head *a* while another workman introduces the tapering end of a tool, *x*, into the end of the rivet, and strikes the tool as many blows with a hammer as may be necessary to expand the end of the rivet and bend it against the object to be secured.

In making the tubular rivet it is preferable for the grain of the iron to be in the direction of the lines in Fig. 4; in other words, that the grain should be at right angles, or thereabout, to the axis of the rivet; otherwise, on being distended and bent in the manner described, it would be apt to split, whereas a sound, unbroken, expanded end may be formed if the grain of the iron be in the direction indicated.

I claim—

1. A tubular rivet made by coiling a strip of iron, as set forth.

2. A tubular rivet in which the grain of the iron takes a transverse course at right angles, or thereabout, to the axis of the rivet, as described, for the purpose specified.

In testimony whereof I have signed my name to this specification in the presence of two subscribing witnesses.

J. E. WOOTTEN.

Witnesses:
JAS. M. LANDIS,
J. E. PRICE.